(12) United States Patent
Domsch et al.

(10) Patent No.: US 8,495,498 B2
(45) Date of Patent: Jul. 23, 2013

(54) VIRTUAL MACHINE MANUFACTURING METHODS AND MEDIA

(75) Inventors: Matthew L. Domsch, Austin, TX (US); Brent Schroeder, Round Rock, TX (US); James Craig Lowery, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 929 days.

(21) Appl. No.: 12/237,347

(22) Filed: Sep. 24, 2008

(65) Prior Publication Data

US 2010/0077391 A1   Mar. 25, 2010

(51) Int. Cl.
*G06F 15/16* (2006.01)
*G06F 17/30* (2006.01)

(52) U.S. Cl.
USPC .......................................... 715/736; 707/204

(58) Field of Classification Search
USPC ....................................................... 717/174
See application file for complete search history.

(56) References Cited

U.S. PATENT DOCUMENTS

| | | | |
|---|---|---|---|
| 7,313,614 B2* | 12/2007 | Considine et al. | 709/223 |
| 7,921,262 B1* | 4/2011 | Dash et al. | 711/154 |
| 2005/0114464 A1* | 5/2005 | Amir et al. | 709/213 |
| 2005/0228835 A1* | 10/2005 | Roa | 707/204 |
| 2006/0282618 A1* | 12/2006 | Thompson et al. | 711/118 |
| 2008/0028399 A1* | 1/2008 | Gupta et al. | 718/1 |
| 2008/0250222 A1* | 10/2008 | Gokhale et al. | 711/203 |
| 2009/0183173 A1* | 7/2009 | Becker et al. | 719/313 |
| 2009/0300173 A1* | 12/2009 | Bakman et al. | 709/224 |
| 2009/0307597 A1* | 12/2009 | Bakman | 715/736 |
| 2010/0070870 A1* | 3/2010 | Halperin et al. | 715/742 |
| 2010/0153617 A1* | 6/2010 | Miroshnichenko et al. | 711/6 |

\* cited by examiner

*Primary Examiner* — Don Wong
*Assistant Examiner* — Mohammad Kabir
(74) *Attorney, Agent, or Firm* — Baker Botts L.L.P.

(57) ABSTRACT

A method for manufacturing an information handling system is disclosed wherein the method includes receiving an order for an information handling system (IHS), wherein the IHS comprises at least one virtual machine (VM) and determining a number of physical systems and an amount of storage required for the IHS. The method may also include providing the number of physical systems and the amount of storage and providing virtualization software for the number of physical systems, wherein the virtualization software is utilized to create the at least one virtual machine. The method further includes pre-configuring a plurality of parameters for the at least one VM.

20 Claims, 5 Drawing Sheets

VIRTUAL MACHINE MANUFACTURING METHODS AND MEDIA

BACKGROUND

1. Technical Field

The present disclosure relates generally to the field of information handling systems, and, more specifically, the disclosure relates to manufacturing information handling systems and virtual machines.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An IHS may be configured in a specific manner to meet a customer's needs. Some customers, such as businesses or companies, may desire one or more IHSs that are set up to provide several virtual machines (VMs). VMs may simulate a physical machine or device including several components or resources, such as a central processing unit (CPU), random access memory (RAM), a network card, and any other suitable components, that may be utilized by the device. A bare metal virtual machine may be a VM that has been pre-configured with memory, CPU, and other resources, but has no operating system installed on its virtual disk. A manufacturer may provide one or more physical systems and storage to a customer, but the customer may need to rack and wire the physical systems and storage, as well as set up the VMs and other desired features to create a bare metal VM from the physical systems. Features, such as failover clustering to provide high availability, fibre channel storage to provide storage networking, and internet small computer system interface (iSCSI) to provide shared storage, may be desired by a customer, but may increase the complexity of configuring the VMs and features on the physical systems. In some cases, determining the number of physical systems and amount of storage needed to set up VMs and other desired features may be a complicated process that makes it difficult for some customers to determine the products that may be needed from a manufacturer. Further, configuring VMs and setting up other features on the physical systems may be difficult as well, which may also lead to customer dissatisfaction.

Thus, a need exists for methods and media for manufacturing bare metal virtual machines that may be pre-configured prior to delivery to a customer. Any of the configurable settings for the bare metal VMs may be configured prior to delivery to a customer.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for manufacturing an information handling system whereby the method includes receiving an order for an information handling system (IHS), wherein the IHS comprises at least one virtual machine (VM) and determining a number of physical systems and an amount of storage required for the IHS. The method may also include providing the number of physical systems and the amount of storage and providing virtualization software for the number of physical systems, wherein the virtualization software is utilized to create the at least one virtual machine. The method further includes pre-configuring a plurality of parameters for the at least one VM.

Another aspect of the disclosure provides a computer-readable medium having computer-executable instructions for performing a method for manufacturing a virtual machine whereby the method includes receiving an order for an information handling system (IHS), wherein the IHS comprises at least one virtual machine (VM) and determining a number of physical systems and an amount of storage required for the IHS. The method may also include providing the number of physical systems and the amount of storage and providing virtualization software for the number of physical systems, wherein the virtualization software is utilized to create the at least one virtual machine. The method further includes pre-configuring a plurality of parameters for the at least one VM.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus, systems and methods are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a device" refers to one or several devices, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
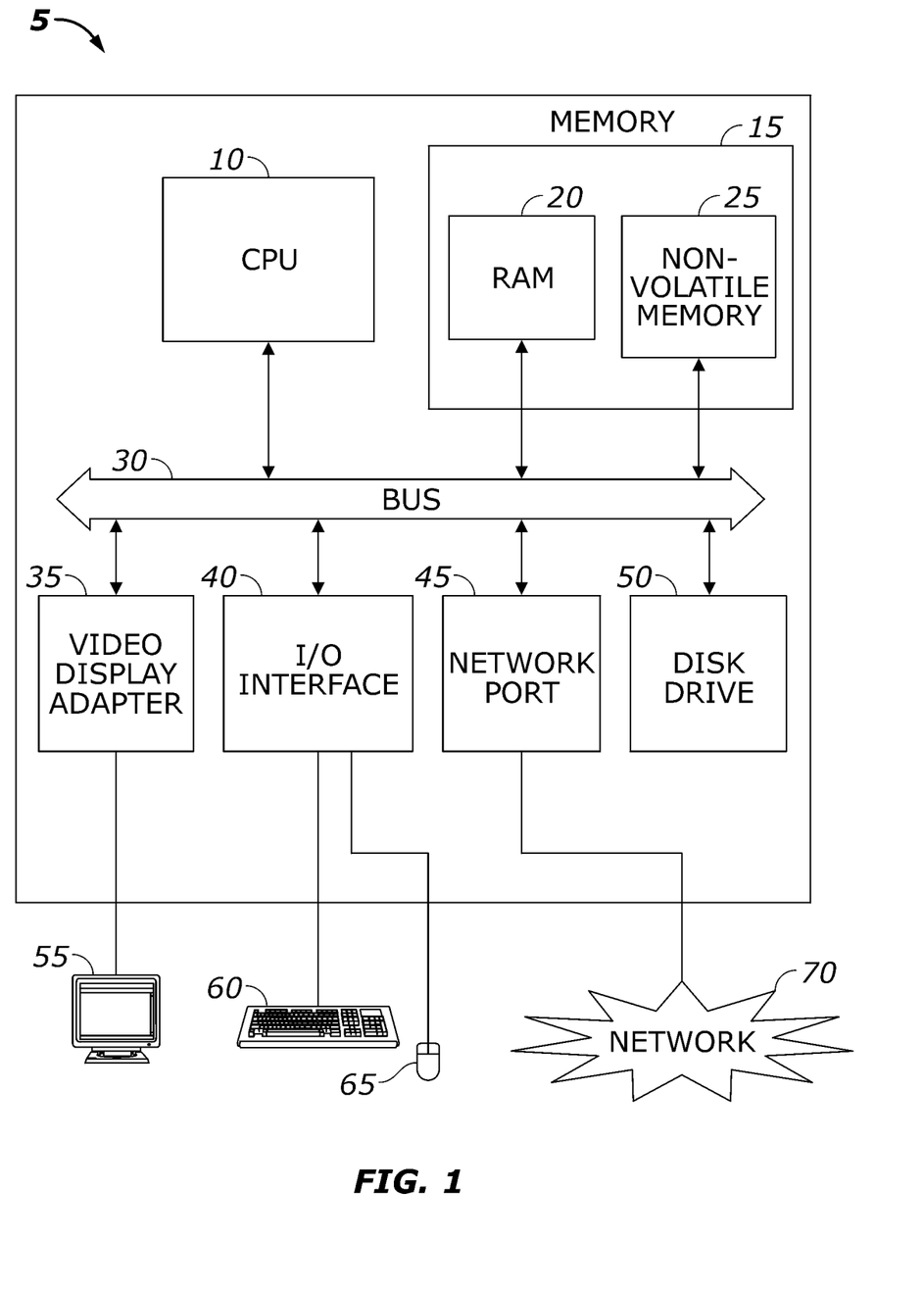
FIG. 1 represents an illustrative schematic of an information handling system (IHS) in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

A manufacturer or vendor may deliver one or more IHSs, such as bare metal virtual machines (VMs), to a customer. Software provided on a physical IHS may be utilized to create one or more virtual machines that simulate a physical IHS and its components. A bare metal VM may include memory, CPU, and other resources, but may possibly not include an operating system (OS) installed on the virtual disk. By way of example, a consumer may want to purchase one or more IHSs from a manufacturer that may be utilized to provide several VM servers with various components, such as memory, CPU, network card, and other resources. The customer may also intend to create a VM farm from the VM servers. A VM farm may include a collection of VM servers operating jointly in order to improve performance and availability when compared to a single server. When the IHSs to be used to create a VM farm are delivered to the customer, a customer may need to wire and rack the IHSs and its shared storage to accommodate the desired VMs. Further, the customer may need to build the clustering environment, which may include establishing shared storage, installing virtualization software, establishing cluster services, and configuring the VMs. If additional features are desired, such as high availability and storage networking, the user may need to perform additional configuring and setup tasks for the VMs. For instance, highly available (HA) and internet small computer system interface (iSCSI) features may require special tasks to be performed, such as configuring clusters for HA and creating targets/initiators for iSCSI. While HA and iSCSI may be discussed throughout to illustrate various implementations, the scope of the claims is in no way limited to the particular features discussed herein. A variety of additional features may be desired by a customer, such as HA, iSCSI, fibre channel storage networking, and other additional features. The process of configuring the VMs and additional features for the VMs may be complex for a typical customer or end user. Further, the end user may need to determine the number of IHSs, shared storage, and other components needed to create the system of VMs, which may also be a complex task. Since a significant burden may rest on a user when creating a system of VMs, a manufacturer may greatly improve a customer's satisfaction by alleviating the burden of creating and configuring a desired system of VMs.

In order to improve the manufacturing process, a system of physical IHSs may be bundled, configured, and installed during manufacturing to provide bare metal VMs including additional features (e.g., iSCSI, fibre channel storage network, HA clustering, etc.) to customers. When a VM is created, several parameters may be configured, such as the amount of memory, processor type and speed, an OS, software, the type of network interface card (NIC), and/or any other suitable parameters. The responsibility for setting these configurable parameters may be shifted from the customer to the manufacturer.

Figure 2:
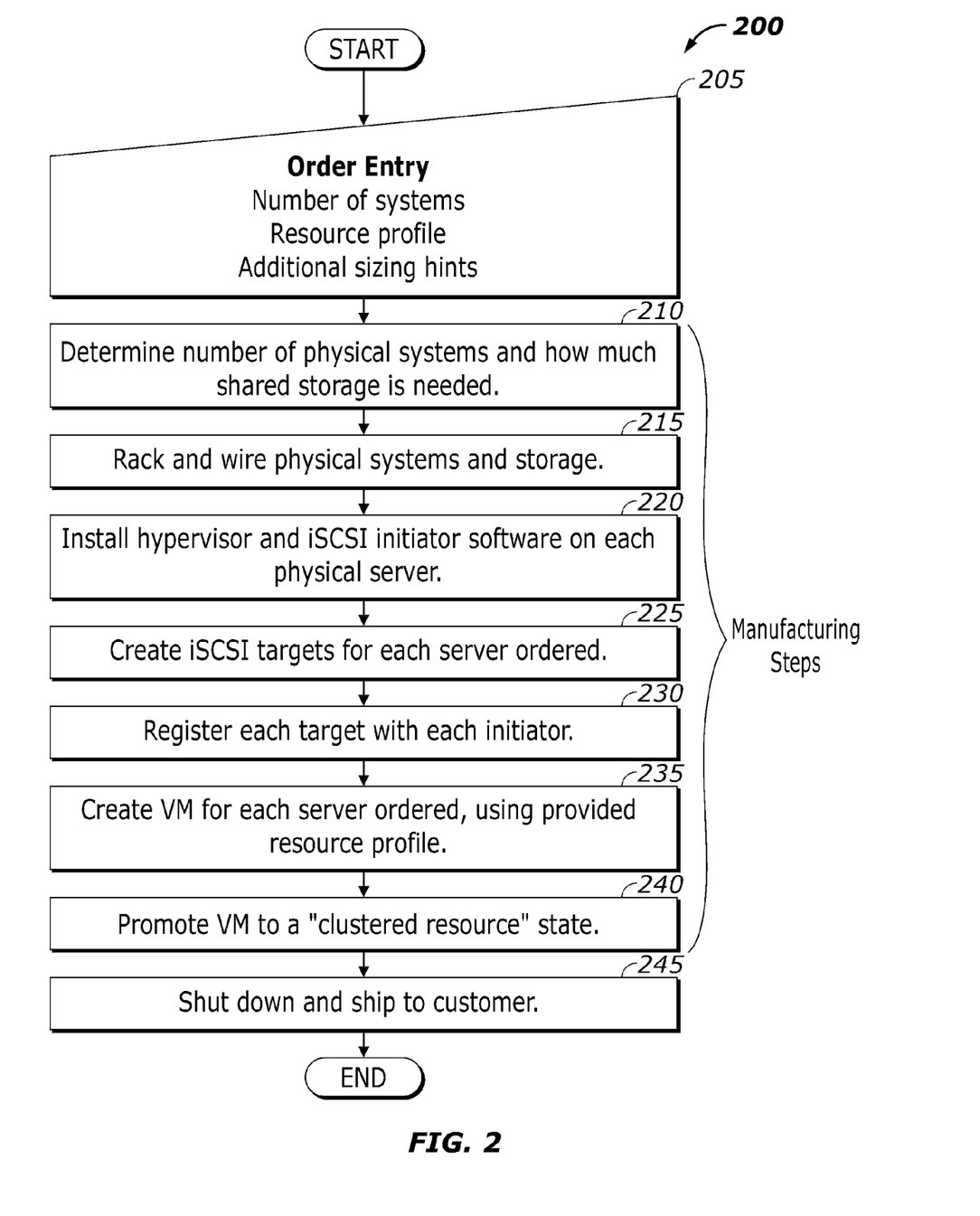
FIG. 2 represents an illustrative flow diagram for a virtual machine (VM) manufacturing process in accordance with another aspect of the present disclosure.

Referring now to FIG. 2, an illustrative implementation of a virtual machine manufacturing process is indicated generally at 200. The manufacturing process may begin when a customer places an order in step 205. The customer's order may specify parameters including, but not limited to, the number of virtual IHSs desired, resource profiles for the virtual IHSs, and additional sizing hints. In addition to selecting the number of IHSs, a customer may also specify the resource profiles for each of the IHSs. As used herein, the number of IHSs in a customer's order may represent the number of VMs desired rather than the number of physical IHSs. The resource profiles may specify several components of an IHS, such as amount of memory, number of CPUs, CPU speed, an operating system (OS), a network interface card (NIC), software, and storage requirements for each of the IHSs. The customer's order may also include additional sizing hints that provide information regarding how the customer may utilize the IHSs, thus affecting the number of IHSs or the shared storage requirements. For instance, the customer may wish to utilize VMs for a Microsoft Exchange Server workload, which may increase the resources required for the physical system.

Based on information in the order received from a customer, the number of physical systems and the amount of shared storage needed may be determined by the manufacturer in step 210. The physical systems may represent the physical IHSs offered by a manufacturer or vendor which may include several different models and selectable components. Shared storage may provide storage to be utilized by one or more physical systems. The shared storage may utilize storage area network (SAN) protocols to allow the shared storage to be remotely connected to the physical systems. Rather than having each customer determine the physical components and the number of physical IHSs needed to achieve a desired virtual system, the manufacturer may take over the responsibility of determining these requirements. A manufacturer may be more familiar with their products than the customer and may have more experience than the customer in determining the number of physical systems needed, which may reduce the chances of miscalculating the physical requirements for the VMs.

Figure 3:
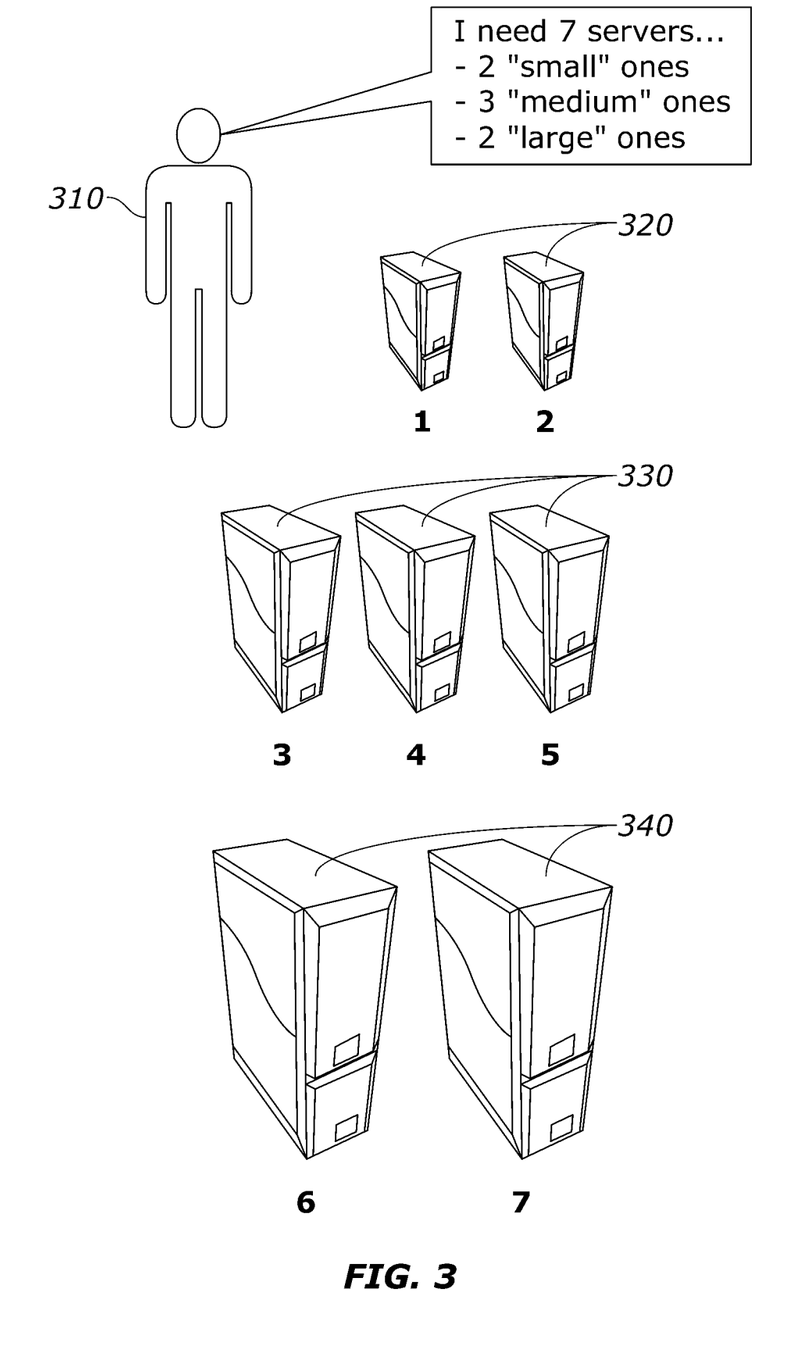
FIG. 3 represents an illustrative schematic of a customer order entry in accordance with another aspect of the present disclosure.

Referring now to FIG. 3, an illustrative implementation of a customer order entry is provided. A customer 310 may specify the number of IHSs desired and resource profiles for each of the IHSs. For instance, the customer's order may specify that seven servers are desired with resource profiles accompanying each of the seven servers. As discussed previously, the resource profiles may indicate the components to be provided a system. For instance, one of the customer's resource profiles may indicate that a first server should have two logical processors, 128 GB RAM, a NIC, and various other suitable, configurable parameters. In the implementation shown, the resource profiles indicate that two small servers 320, three medium servers 330, and two large servers 340 are desired.

Figure 4:
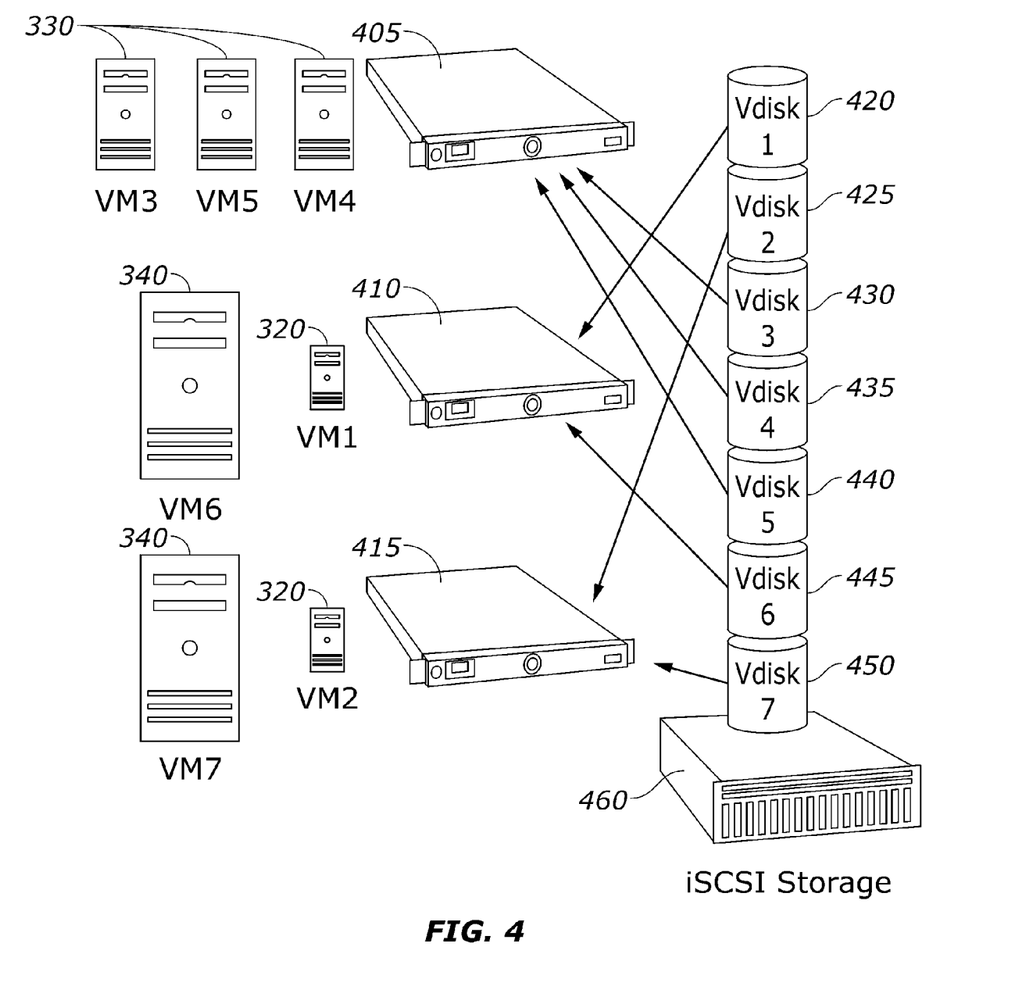
FIG. 4 represents an illustrative schematic of physical systems corresponding to a customer order in accordance with yet another aspect of the present disclosure.

FIG. 4 provides an illustrative implementation of physical systems corresponding to a customer order. A manufacturer or vendor may determine the number of physical IHSs and amount of storage required for the customer's order as discussed previously. This determination may be manufacturer specific because different manufacturers may provide products that perform differently. As shown, a manufacturer may determine that three physical IHSs 405, 410, and 415 and an iSCSI storage 460 are required to satisfy a customer order. A first physical IHS 405 may be utilized for the three medium servers 330, a second physical IHS 410 may be utilized to support a large server 340 and a small server 320, and a third physical IHS 415 may be utilized to support a large server 340 and a small server 320. Based on the resource profiles for the seven servers, the amount of shared storage needed in the iSCSI storage 460 may be determined. The iSCSI storage 460 may be utilized to serve as virtual disks 420-450 for the servers in the customer order.

Regarding FIG. 2, in step 215, the physical systems and storage may be pre-wired, racked, and stacked by the manufacturer. For instance, as shown in FIG. 4, the physical systems 405-415 may be racked and wired with the iSCSI storage 460. In step 220, virtualization software may be installed on each physical IHS included in the order. Virtualization software, such as hypervisor, may allow multiple OSs to run on a host, which may run directly on a given hardware platform. In another implementation, virtualization software may be installed on shared storage or may be provided across the network when the physical IHS is booted. In some cases, the customer may want to utilize iSCSI software to setup and allow the VMs to utilize remote storage, such as iSCSI storage. If the customer desires iSCSI storage, then iSCSI initiator software may be installed in step 220. The iSCSI storage 460 may be configured to associate the virtual disks 420-450 with the physical IHSs 405-415 providing a corresponding server 320-340. For example, since the first physical IHS 405 is utilized to provide the medium servers 330, virtual disk #3 430, virtual disk #4 435, and virtual disk #5 440 may be associated with the first physical IHS 405.

iSCSI is a protocol that may allow initiators to send SCSI commands to targets on remote servers utilizing a transmission control protocol/internet protocol suite (TCP/IP). An initiator may be a client utilizing iSCSI to communicate with a SCSI device. Further, an initiator may send SCSI commands over an IP network rather than using a physical cable such as a traditional SCSI client. A target may be a storage resource located on a remote device, such as an iSCSI logical unit number (LUN) created on shared storage. Registration of targets and initiators, which may be performed by customers after receiving physical systems from a manufacturer, may be a manual process or may require the use directory services, such as internet storage name service (iSNS). The iSNS protocol may allow automated discovery, management, and configuration of iSCSI and fibre channel devices on a TCP/IP network. An iSNS server may be bundled with the order if desired by the customer. In the improved manufacturing process, registration of iSCSI targets and initiators may be performed during manufacturing, rather than by the customer. Several iSCSI targets may be created for each IHS ordered in step 225 and each target may be registered with each initiator in step 230. By installing iSCSI initiator software, the number and size of iSCSI targets and the set of initiators requiring access to the cluster nodes may be pre-determined and pre-registered by the manufacturer.

Once the iSCSI configuration is complete, the VMs may be created for each IHS ordered utilizing the provided resource profiles in step 235. For instance, the small 320, medium 330, and large servers 340 corresponding to the resource profiles in the order may be created on the physical IHSs 405, 410, and 415 and corresponding virtual disk 420-450 may be created on the shared storage 460 as shown in FIG. 4. In step 240, the VMs may be promoted to a clustered resource state to improve performance and availability. In a cluster resource state, at least two physical IHSs may be aware of a VM and the VM may be capable of being hosted by either one of the two physical IHSs as needed. For instance, hosting of a VM may be shifted from one physical IHS to another if one of the physical IHSs fails, if one of the physical IHSs needs to undergo scheduled hardware maintenance, or if one of the physical IHSs is unavailable for some other reason. A user may also want to provide HA VMs by utilizing failover clustering. A failover cluster may include redundant nodes utilized to provide services when a component fails to increase the availability of applications and services. Failover clustering software may be utilized to create and manage the clusters to provide failover clustering.

Figure 5:
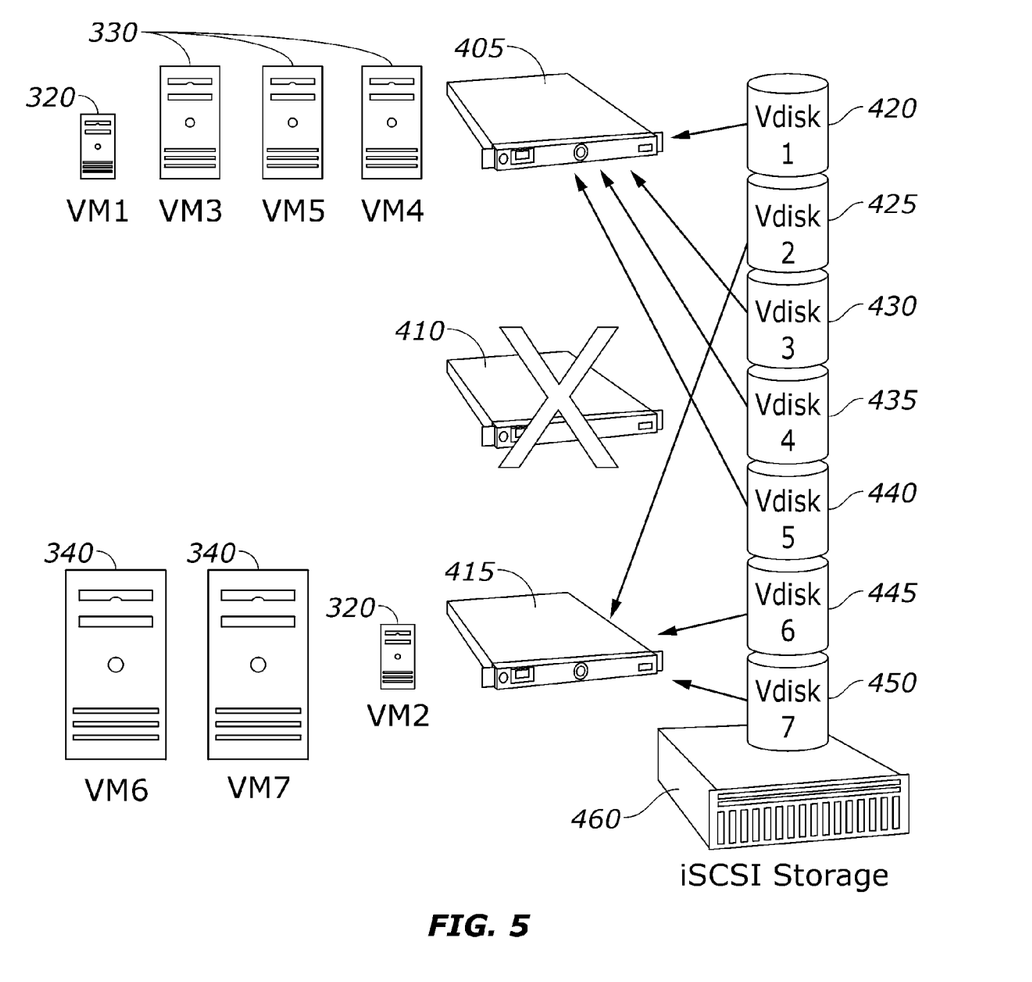
FIG. 5 represents an illustrative schematic of a failover state in accordance with still another aspect of the present disclosure.

FIG. 5 provides an illustrative implementation of a failover state for the system illustrated in FIG. 4. When iSCSI is utilized to host the virtual disk 420-450 for VMs 320, 330, and 340, a target may be created on shared storage, such as iSCSI storage 460. The targets may be registered with several physical systems 405, 410, and 415 hosting the VMs 320, 330, and 340. In implementations utilizing HA clustering, targets may be registered as HA resources across all cluster nodes and may move between nodes when failover or forced migration occurs. For instance, when one of the cluster nodes 410 fails, other nodes 405 and 415 may provide services for the failed node instead, a process referred to as failover. By utilizing failover clustering, the disruptions in service experienced by a user may be minimized.

Once the ordered VMs and desired features are configured, the physical systems may be shut down and shipped to the customer in step 245. The VM manufacturing process may allow a manufacturer to provide a HA bare metal VM to a consumer. The virtualization software supporting the bare metal VMs may also include additional software to allow the manufacturer to provide pre-configured VMs supporting iSCSI, fibre channel storage, high availability, and/or other additional features desired by a customer prior to delivery. System management software may be included to manage a cluster transparently or manage the cluster in an automated fashion so that the customer may not need to worry about routine and ongoing actions particular to their maintenance. For example, the system management software may insure that the VMs are load balanced, force migration to maintain load balance, send alerts when hardware fails and needs replacement, and perform any other suitable management task. This may allow the manufacturer to provide a customer with a racked and stacked system of IHSs providing HA, fibre channel storage, iSCSI storage, and/or other features that may require little to no configuration by the customer. The VM manufacturing process may allow the manufacturer to take over building the clustering environment, including tasks such as installing virtualization software, establishing cluster services, and configuring the VMs from a customer. The customer may simply plug in the power supply and install operating systems to begin using the VMs.

Various methods are contemplated including all or less than all of the steps described herein and/or mentioned above, any number of repeats or any of the steps shown and/or mentioned above, and performance of the steps in any order.

Methods of the present disclosure may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, a computer-executable instruction, such as a program module, may include a routine, program, object, data structures and the like, which perform particular tasks, carry out particular methods or implement particular abstract data types. Those skilled in the art will appreciate that the abovementioned media may take various forms such as cards, tapes, magnetic disks (e.g., floppy disk or hard drive), optical disks (e.g., compact disk read only memory ("CD-ROM") or digital versatile disc ("DVD")) or any other medium/media which can be used to store desired information and which can accessed by an IHS. It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for manufacturing an information handling system prior to delivery to a customer, the method comprising:
   receiving an order for an information handling system (IHS), wherein the IHS comprises at least one pre-configured bare metal virtual machine (VM) and a set of requirements for the at least one pre-configured bare metal VM;
   determining a number of physical systems and an amount of storage required for the IHS to meet the set of requirements for the at least one pre-configured bare metal VM;
   providing the number of physical systems and the amount of storage;
   providing virtualization software for the number of physical systems, wherein the virtualization software is utilized to create the at least one pre-configured bare metal virtual machine; and
   pre-configuring a plurality of parameters desired by the customer for the at least one bare metal VM prior to delivery to the customer.

2. The method of claim 1, wherein the plurality of parameters are selected from the group consisting of an amount of memory, a central processing unit (CPU) speed, an operating system (OS) type, a software type, a network interface card (NIC) type and a combination thereof.

3. The method of claim 1 further comprising:
   installing internet small computer system interface (iSCSI) software on the number of physical systems, wherein the iSCSI software is utilized to provide shared storage for the number of physical systems.

4. The method of claim 3 further comprising:
   creating a plurality of initiators for each of the at least one VM, wherein the plurality of initiators are utilized to send iSCSI commands over an internet protocol (IP) network; and
   creating a plurality of iSCSI targets for each of the at least one VM, wherein a plurality of iSCS1 logical unit numbers (LUNs) are created on the shared storage to be provided to the plurality of iSCSI targets.

5. The method of claim 4 further comprising:
   associating each of the plurality of iSCSI targets with one of the plurality of initiators, wherein the at least one VM utilizes the plurality of iSCSI targets as a plurality of virtual disks.

6. The method of claim 1 further comprising:
   creating the at least one VM on the number of physical systems, wherein the at least one VM simulates a physical system with a plurality of components, the plurality of components selected from the group consisting of a random access memory (RAM), a central processing unit (CPU), a network interface card (NIC), a storage device and a combination thereof.

7. The method of claim 1 further comprising:
   promoting the at least one VM to a clustered resource state, wherein the at least one VM is hosted by a first physical system, and the at least one VM is hosted by a second physical system if the first physical system becomes unavailable.

8. The method of claim 7 further comprising:
   installing failover clustering software for the at least one VM, wherein the failover clustering software is operable to configure the IHS to perform failover clustering.

9. The method of claim 7, wherein system management software insures the at least one VM is pre-configured to maintain the clustered resource state in an automated fashion.

10. The method of claim 1, wherein the number of physical systems required is determined by a plurality of resource profiles for each of the at least one VM.

11. A computer-readable medium having computer-executable instructions for performing a method for manufacturing a virtual machine, the method comprising:

receiving an order for an information handling system (IHS), wherein the IHS comprises at least one pre-configured bare metal virtual machine (VM) and a set of requirements for the at least one pre-configured bare metal VM;

determining a number of physical systems and an amount of storage required for the IHS to meet the set of requirements for the at least one pre-configured bare metal VM;

providing the number of physical systems and the amount of storage;

providing virtualization software for the number of physical systems, wherein the virtualization software is utilized to create the at least one pre-configured bare metal virtual machine; and pre-configuring a plurality of parameters desired by a customer for the at least one bare metal VM prior to delivery to the customer.

12. The computer-readable medium of claim 11, wherein the plurality of parameters are selected from the group consisting of an amount of memory, a CPU processor speed, an operating system (OS) type, a software type, a network interface card (NIC) type and a combination thereof.

13. The computer-readable medium of claim 11 having further computer-executable instructions for performing the method comprising:

installing internet small computer system interface (iSCSI) software on the number of physical systems, wherein the iSCSI software is utilized to provide shared storage for the number of physical systems.

14. The computer-readable medium of claim 13 having further computer-executable instructions for performing the method comprising:

creating a plurality of initiators for each of the at least one VM, wherein the plurality of initiators are utilized to send iSCSI commands over an internet protocol (IP) network; and creating a plurality of iSCSI targets for each of the at least one VM, wherein a plurality of iSCS1 logical unit numbers (LUNs) are created on the shared storage to be provided to the plurality of iSCSI targets.

15. The computer-readable medium of claim 14 having further computer-executable instructions for performing the method comprising:

associating each of the plurality of iSCSI targets with one of the plurality of initiators, wherein the at least one VM utilizes the plurality of iSCSI targets as a plurality of virtual disks.

16. The computer-readable medium of claim 11 having further computer-executable instructions for performing the method comprising:

creating the at least one VM on the number of physical systems, wherein the at least one VM simulates a physical system with a plurality of components, the plurality of components selected from the group consisting of a random access memory (RAM), a central processing unit (CPU), a network interface card (NIC), a storage device and a combination thereof.

17. The computer-readable medium of claim 11 having further computer-executable instructions for performing the method comprising:

promoting the at least one VM to a clustered resource state, wherein the at least one VM is hosted by a first physical system, and the at least one VM is hosted by a second physical system if the first physical system becomes unavailable.

18. The computer-readable medium of claim 17 having further computer-executable instructions for performing the method comprising:

installing failover clustering software for the at least one VM, wherein the failover clustering software is operable to configure the IHS to perform failover clustering.

19. The computer-readable medium of claim 17, wherein system management software insures the at least one VM is pre-configured to maintain the clustered resource state in an automated fashion.

20. The computer-readable medium of claim 11, wherein the number of physical systems required is determined by a plurality of resource profiles for each of the at least one VM.

* * * * *